J. F. O'CONNOR.
FRICTION SHOCK ABSORBING MECHANISM.
APPLICATION FILED SEPT. 23, 1918.

1,307,314.

Patented June 17, 1919.

Inventor
John F. O'Connor

By George I. Haight
Atty.

UNITED STATES PATENT OFFICE.

JOHN F. O'CONNOR, OF CHICAGO, ILLINOIS, ASSIGNOR TO WILLIAM H. MINER, OF CHAZY, NEW YORK.

FRICTION SHOCK-ABSORBING MECHANISM.

1,307,314. Specification of Letters Patent. Patented June 17, 1919.

Application filed September 23, 1918. Serial No. 255,243.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

One object of the invention is to provide a high capacity friction shock absorbing mechanism and having certain release, all of the parts being so designed as to be capable of easy and cheap manufacture.

More specifically, the object of the invention is to provide a friction shock absorbing mechanism adapted for railway draft riggings.

Figure 1:
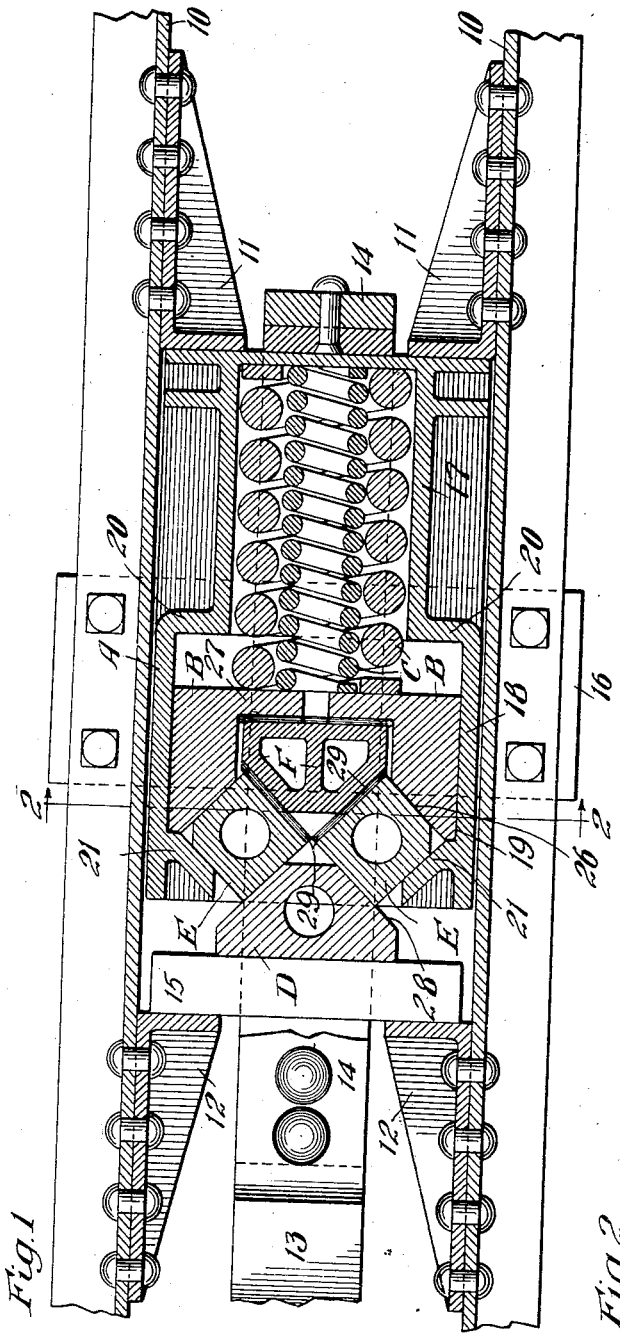
Figure 3:
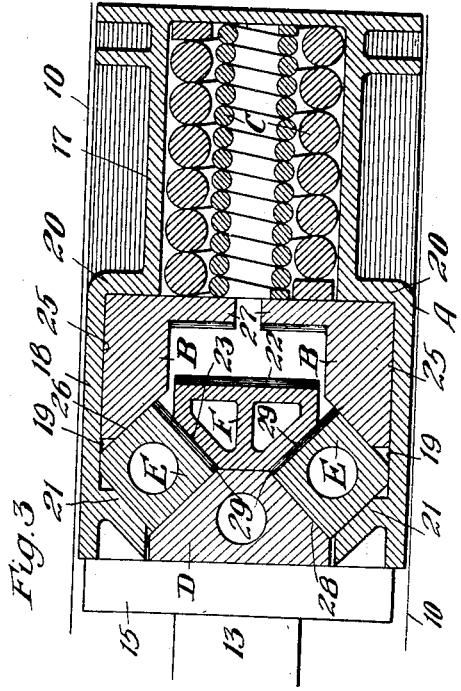
Figure 2:
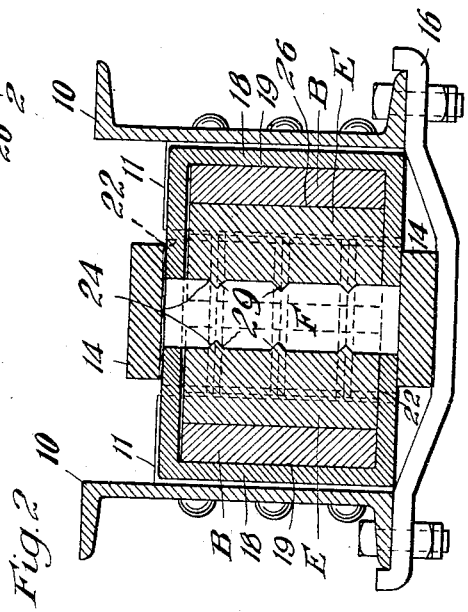

In the drawings forming a part of this specification, Figure 1 is a longitudinal, horizontal, sectional view of a portion of a railway draft rigging showing my improvements in connection therewith. Fig. 2 is a vertical, transverse, sectional view, taken on the line 2—2 of Fig. 1. And Fig. 3 is a view of the shock absorbing mechanism proper similar to Fig. 1 but illustrating the position of the parts under full compression.

In said drawings, 10—10 denote channel-shaped draft sills of a railway car, to the inner faces of which are secured rear stop lugs 11—11 and front stop lugs 12—12. The rear portion of the draw bar shank is indicated at 13 to which is secured the usual strap yoke 14, the latter encircling the shock absorbing mechanism proper and a front follower 15. The parts are supported by a detachable saddle plate 16.

The shock absorbing mechanism proper, as shown, consists of a combined friction shell and spring casing A; a pair of friction shoes B—B; spring resistance C; a pressure-transmitting member or wedge D; a pair of friction blocks E—E; and a cross bar F relatively fixed with respect to the casting A.

The casting A is formed with a spring casing 17 at its rear end within which is located the spring means C. At its forward end the casting A is formed with a friction shell 18 having interior opposed friction faces 19 extending lengthwise of the casting. The casting is formed also with transverse shoulders 20—20 at the inner end of the friction shell and with oppositely inclined shoulders 21—21 near the outer end of the friction shell for the purpose hereinafter specified.

The cross bar or bridge F is made separate from the casting A and is insertible through suitable openings 22 in the upper and lower walls of the shell portion thereof. Said bar F is formed on its forward side with inclined wedge friction faces 23—23 that are provided with a series of shallow grooves, as indicated at 24 in Fig. 2. The friction wedge faces 23 are arranged preferably at an angle of 45° to the longitudinal axis of the gear.

The friction shoes B normally occupy the position shown in Fig. 1 and each shoe is provided with an outer friction face 25 coöperable with the corresponding friction face 19 of the shell and with an inclined friction wedge face 26 at its forward end, the faces 26 being arranged perpendicular to the faces 23. At their inner ends, the shoes B are formed with inward extensions 27 which engage the forward end of the spring C. As apparent from Fig. 3, the shoes B are adapted to be limited in their inward movement by engagement with the shoulders 20, thereby preventing over-compression of the spring.

The pressure member D is engaged by the front follower 15 and on its inner side is formed with friction wedge faces 28—28 also at an angle of 45° to the center line of the gear. The friction blocks E are preferably square in cross section and are interposed between the pressure member D and the shoes B. The blocks E are preferably formed with a series of tenons 29 coöperable with the grooves 24 of the bar or bridge F. The operation is as follows: Assuming the parts in the position shown in Fig. 1, upon inward movement of the draw bar and thereby the pressure member D, it is evident that the blocks E will be forced rearwardly and also laterally. This generates friction between the member D and blocks E and also between the latter and the bar F. The lateral movement of the blocks E is communicated to the shoes B so that the latter are forced rearwardly, thus generating friction between the blocks E and shoes B and between the latter and the friction shell. Inward movement is limited by engagement of the shoes B with the shoulders 20, as heretofore explained, and also may be limited by engagement of the blocks E with the shell A, as shown in Fig. 3, and by the pressure member D engaging the bar F. During this compressive action, it is not intended that any friction be generated between the blocks E and the outer shoulders 21 of the shell. The function of the shoulders 21 is to positively insure the return of all of the friction elements to their proper position upon full release. During the initial portion of the release, the shoes B, blocks E and member D will tend to move outwardly as a unit without any relative movement therebetween to take up the space, if any, that may be between the blocks E and shoulders 21 occasioned by wear on the parts after the mechanism has been in service. With the blocks E in engagement with the shoulders 21 relative movement between the friction elements is positively induced and the blocks E forced over against the bar F. In assembling the parts, it will be understood that the shoes B are inserted before the bar F and the latter will serve to retain the shoes B against accidental removal.

I claim:

1. In a friction shock absorbing mechanism, the combination with a friction shell having friction faces extending longitudinally thereof, of friction shoes coöperable with and slidable along said faces, spring means resisting relative movement between said shoes and shell, a movable pressure member, a bar relatively fixed with respect to said shell, and movable blocks interposed between said member and shoes, said blocks having sliding frictional contact with said member, bar and shoes, said bar being removable from the shell and said shoes having extensions at their inner ends interposed between said bar and the spring means.

2. In a friction shock absorbing mechanism, the combination with a friction shell, of friction shoes coöperable therewith, spring means arranged to resist relative movement between said shoes and shell, a longitudinally movable pressure member, a bar fixed with respect to said shell, friction blocks interposed between said member and said shoes and also engaging said bar, said blocks being moved laterally outward upon longitudinal movement of said member, and means rigid with respect to said shell for positively insuring inward lateral movement of said blocks during the release action of the mechanism.

3. In a friction shock absorbing mechanism, the combination with a friction shell, of friction shoes coöperable therewith, spring means arranged to resist relative movement between said shoes and shell, a longitudinally movable pressure member, a bar fixed with respect to said shell, friction blocks interposed between said member and said shoes and also engaging said bar, said blocks being moved laterally outward upon longitudinal movement of said member, and means rigid with respect to said shell for positively insuring inward lateral movement of said blocks during the release action of the mechanism, said means comprising inclined shoulders at the outer end of the shell arranged to engage said blocks.

In witness that I claim the foregoing I have hereunto subscribed my name this 3rd day of Sept. 1918.

JOHN F. O'CONNOR.